May 25, 1954
G. E. GREEN
2,679,254
COMBINATION AUTOMOBILE SHROUD AND RETRACTOR
Filed Sept. 16, 1952
2 Sheets-Sheet 1
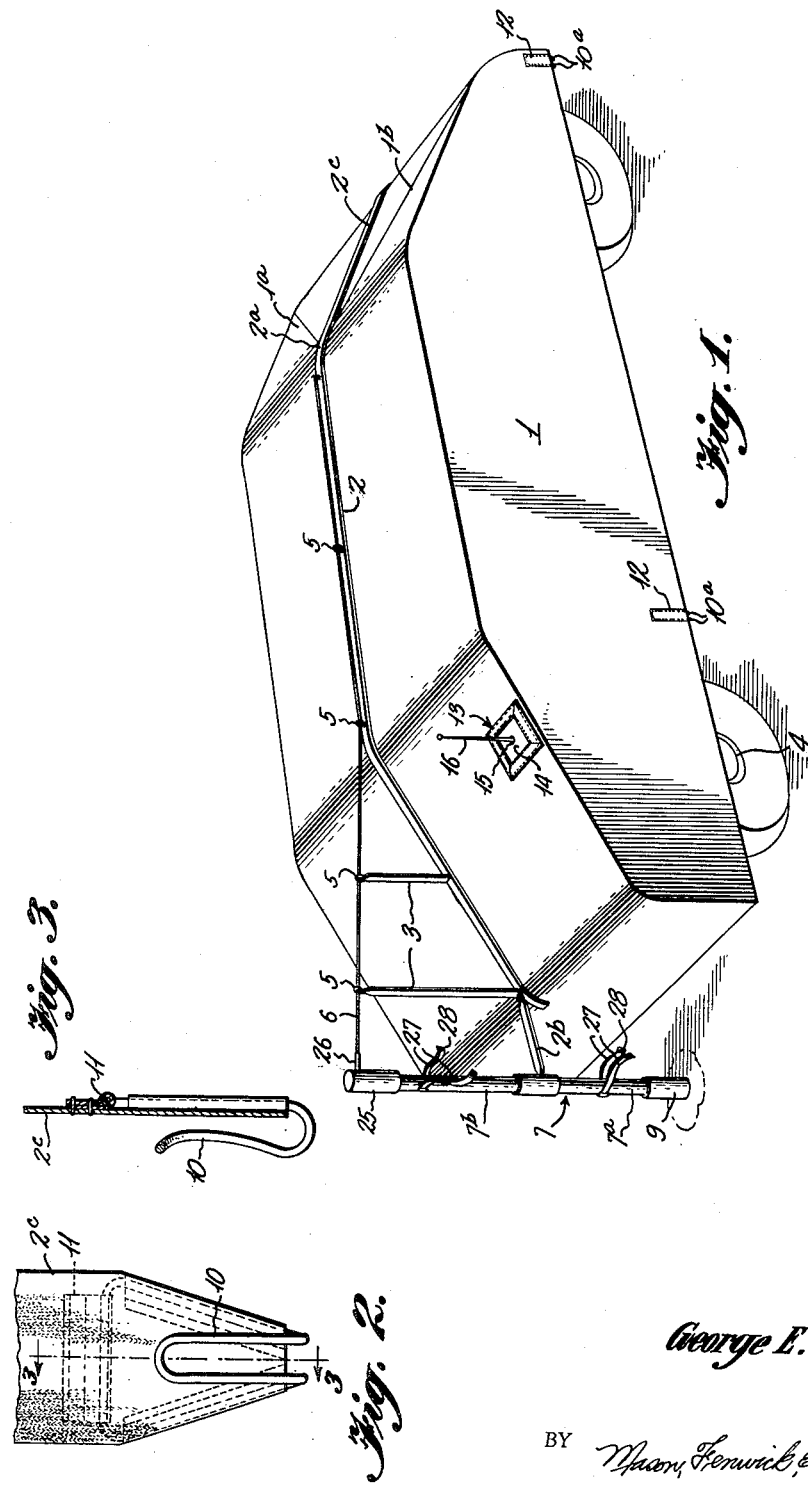
INVENTOR
George E. Green
BY Mason, Fenwick & Lawrence
ATTORNEYS May 25, 1954 G. E. GREEN 2,679,254
COMBINATION AUTOMOBILE SHROUD AND RETRACTOR
Filed Sept. 16, 1952 2 Sheets-Sheet 2
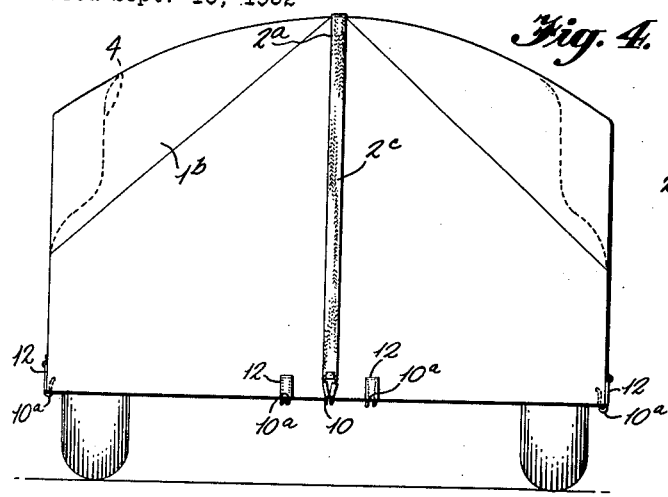
Fig. 4.
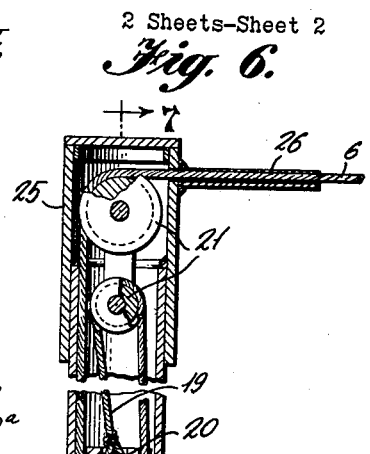
Fig. 6.
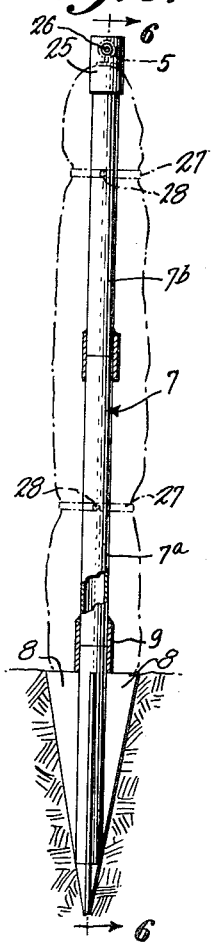
Fig. 5.
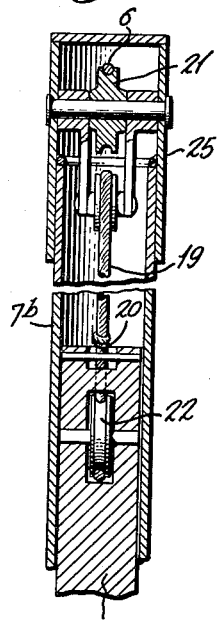
Fig. 7.
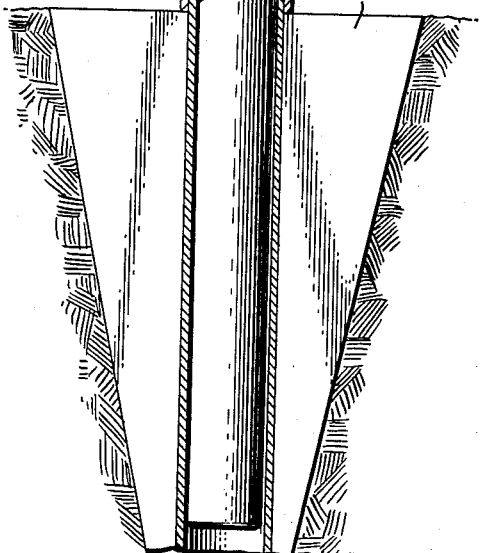
INVENTOR
George E. Green
BY Mason, Fenwick & Lawrence
ATTORNEYS Patented May 25, 1954

2,679,254

UNITED STATES PATENT OFFICE 2,679,254

COMBINATION AUTOMOBILE SHROUD AND RETRACTOR

George E. Green, Aiken County, S. C.

Application September 16, 1952, Serial No. 309,873

4 Claims. (Cl. 135—1)

This invention relates to an automobile shroud, and more particularly, to an automatically retractable shroud which is supported and furled about a stationary post when not in use.

It is known in the art to provide a canopy or shroud for covering an automobile which generally includes a mount on the automobile itself. These in general have the outstanding disadvantage of being relatively complicated in design and expensive to manufacture and requiring substantial time and effort for the shrouding and unshrouding operations, also occupying appreciable storage space.

An object of the present invention is to provide a novel automatically retractable shroud for automobiles that is devoid of the above named disadvantages of conventional shrouds, and which can be easily and quickly shrouded on an automobile in the matter of about ten seconds and stored compactly in a comparable short time by the aid of automatically retractable means.

A more specific object of the present invention is to provide an automobile shroud retractor in the form of a stationary post about which the shroud may be furled when not in use, and which includes means for automatically and quickly retracting the shroud from its covering position with respect to an automobile onto the post about which it may be compactly furled.

Other objects and advantages of the present invention will become apparent from a study of the following description taken with the accompanying drawings.

In the drawings which accompany the following specification, and throughout the figures of which the same reference numerals have been used to denote identical parts:

Figure 1 is a perspective view of an automatically retractable shroud embodying the principles of my invention and showing the shroud as it completely covers an automobile;

Figure 2 is an enlarged plan view of a holddown clip and supporting web portion such as shown at the rear of the shroud;

Figure 3 is a vertical cross-sectional view taken along the line 3—3 of Figure 2;

Figure 4 is a rear elevational view of the shrouded automobile shown in Figure 1;

Figure 5 is a vertical plan view partly in cross-section of the standard or post, and showing the outlines of the shroud furled thereabout;

Figure 6 is an enlarged cross-sectional view, broken away in parts, taken along the line 6—6 of Figure 5; and Figure 7 is a vertical cross-sectional view taken along the line 7—7 of Figure 6.

Referring more particularly to Figure 1 of the drawings, numeral 1 denotes an automobile shroud made of plastic material, nylon parachute cloth or other nylon material, or in fact, any suitable material for providing a protective covering for an automobile to minimize rusting and the like. Extending substantially centrally and longitudinally of shroud 1 is a strip of webbing 2 to which are attached, at spaced intervals, strips of webbing 3. Strips 3 are adapted to extend substantially vertically when the shroud covers the automobile 4, as shown in Figure 1, and these strips terminate in cable rings or loops 5 through which there extends a retracting cable 6. The retracting cable 6 may be made of extra flexible bronze similar to so-called "Swedish rope" and may be approximately ⅛ inch in diameter, or it may be of other suitable material and of other diameters. The end portion of cable 6 extends through other cable rings 5 which are secured at spaced points along the webbing 2 and the extreme end of the cable is rigidly secured and forms a dead end at the crotch portion 2a of the strip from which the rear flaps 1a and 1b extend. The other extreme end portion of strip 2, namely, 2b, is preferably in the form of an elastic web which is attached to standard or post 7.

Extending between rear flaps 1a and 1b is a rear hold-down web portion 2c, preferably of elastic material at least in part, terminating in a tapered stitched portion which supports a holddown clip 10, as shown more clearly in Figure 4. Clip 10 is in the form of a closed loop which is bent to form a hook, as shown more clearly in Figures 2 and 3. Clip 10 is supported by a folded strip 11 which is stitched to the web portion 2c. Along the tapered end portions of the web portion 2c, the edge portions are folded over and stitched so as to conform and surround the angularly disposed portions of the hold-down clip 10. The hold-down clip 10 is adapted to be attached to the bottom edge of the rear bumper as shown in Figure 4. Similar holddown clips 10a are similarly supported on short flexible strips 12 attached to the lower side edges of the shroud 1 for attachment to the lower edges of the front and rear fenders of the automobile, also to the lower edges of the rear flaps 1a and 1b.

For automobiles having radio antennas projecting vertically from one of the sides of the cowl thereof, there may be provided an antenna patch 13 having turned-in marginal edges which may be sewed to the perimeter of a sheet of rubber 14 having a central hole 15 through which the antenna 16 is adapted to project and snugly fit.

The details of the standard or post 7 are more clearly shown in Figures 5, 6 and 7. Referring to these figures, it will be noted that post 7 has a lower portion 7a which is embedded in the ground, perhaps to an extent of two and one-half feet, and an upper portion above ground level which may extend to a height of six and one-half feet, more or less. Post 7 may advantageously be made of three inch steel tubing having a wall thickness of one-eighth inch, or may be made of three inch iron or aluminum pipe or of other materials of suitable dimensions. Tapered vanes 8 are integrally secured radially of the underground portion of the post 7. A tube 9 may be slip fitted to the post above ground level and integrally secured along its top edge thereto by welding. A counterweight 18 is suspended inside of the lower portion 7a of a standard, and is supported by cable 19. The cable is dead ended at 20 and entrained about the upper sheaves 21 and lower sheaves 22. The uppermost sheave is pivotally mounted in a rotatable cap 25 on the top of the post, and the lower sheave 22 is rotatably mounted in counterweight 18 and the linear movement of the cable portion emerging from the top of the post is a multiple of the linear relative movement between the upper and lower sheaves. This eliminates the necessity of providing an unduly tall post. Of course, additional sheaves for allowing even shorter heights of the post may be provided, if so desired.

At the very top of the post the head or cap 25 is rotatable through an angle of 360° about the axis of the post, and has integrally secured thereto in registry with a hole in the side thereof, spindle 26 through which the cable 6 is adapted to extend, and for supporting cable rings 5 when the shroud is furled about post 7.

When the shroud 1 is not in use to cover the automobile, it is furled about standard 7, as shown in dot-and-dash outline in Figure 5. It is held in the furled position about the post by means of elastic ties 27 provided with snap fasteners 28.

In operation, the car may approach the standard from any radial angle throughout an arc of 360°, since by merely rotating head 25 the spindle 26 may be moved in alignment with and point to the car so that the extreme end of cable 6 may be pulled through spindle 26 and over the top of the car. As the cable end is pulled and extended longitudinally over the top central portion of the car by pulling on the rear hold-down clip 10, the shroud 1 will become unfurled from post 7 and will be draped over the top of the car. After the cable end and hold-down clip 10 have been pulled sufficiently to enable clipping onto the rear bumper, the rear flaps 1a and 1b are still open, therefore must be brought together and closed by similar clips fastened to the bottom edge of the rear bumper. Of course, at the same time, the antenna patch 13 is moved so that its hole 15 will come into registry with the antenna 16. After the shroud 1 completely drapes the car, the side hold-down clips 10a are fastened to the bottom edges of the front and rear fenders so as to securely anchor the shroud in place over the car.

When it is desired to remove the shroud from the car, the reverse of the above steps is performed, that is, the side and rear hold-down clips 10a and then the rear hold-down clip 10 are detached, and cord 6 is allowed to be drawn inwardly of the standard 7 by the retracting force of counterweight 18, to form folds in the shroud. Finally, as the dead end 2a of the cord approaches the top of standard 7, rings 5 are slipped onto spindle 26 and the shroud is furled about the post and clamped tightly thereto by means of the elastic ties 27 held in place by fasteners 28.

Thus it will be seen that I have provided a novel, highly efficient, automatically retractable shroud which may be furled about a stationary post of relatively low height, and which thus occupies a minimum amount of space when not in use, and which can be easily and quickly unfurled and retracted from the post and draped over an automobile approaching the post from any radial direction in a very short time, that is, a matter of not more than ten seconds. Furthermore, I have provided a shroud which will completely cover and protect an automobile and which is securely and yieldingly anchored to portions of the automobile to prevent blowing away. Also, I have provided an automatically retractable shroud for an automobile which is of relatively simple construction comprising a minimum number of parts, and which is inexpensive to manufacture and neat in appearance.

While I have illustrated and described a certain specific modification of my invention, it will be understood that this is by way of illustration only, and that various changes and modifications may be made within the contemplation of my invention and within the scope of the following claims.

What I claim as my invention is:

1. In combination, a ground supported post and a flexible automobile shroud including, when it is on the automobile, a middle substantially horizontal roof covering portion and end portions inclined downwardly therefrom, the top of said post being at least as high as the level of said middle portion, said shroud when on the automobile, being adapted to be positioned with its longitudinal center line substantially in a vertical plane embracing said post, a retriever within said post, a cable issuing from said post at the top having one end fixed to said retriever and the other end secured to said shroud at a point in said center line adjacent the transverse line of deflection of the end portion remote from said post with said middle portion, means adjacent the lower edge of said last named end portion engageable with the adjacent bumper of the automobile for holding said cable taut against the bias of said retriever, guiding connections between said shroud and cable, secured to said shroud at spaced points along said center line, including rings freely slidable on said cable, whereby when said bumper engaging means is released, said cable is retrieved within said post independently of said shroud, suspending the latter from the top of said post on the outside thereof at the point at which said cable is secured to said shroud.

2. The combination as claimed in claim 1, including a rotatable head on said post having a radial tubular extension through which said cable passes and upon which said rings telescope and are supported, as said cable is retrieved.

3. In combination, a ground supported post and a flexible automobile shroud including, when it is on the automobile, a middle substantially horizontal roof covering portion and end portions inclined downwardly therefrom, the top of said post being at least as high as the level of said middle portion, said shroud when on the automobile being adapted to be positioned with its longitudinal center line substantially in a vertical plane embracing said post, a retriever within said post, a cable issuing from said post at the top having one end fixed to said retriever and the other end secured to said shroud at a point in said center line adjacent the transverse line of deflection of the end portion remote from said post with said middle portion, means adjacent the lower edge of said last named end portion engageable with the adjacent bumper of the automobile for holding said cable taut against the bias of said retriever, guiding connections between said shroud and cable, secured to said shroud at spaced points along said center line, including rings freely slidable on said cable, whereby when said bumper engaging means is released said cable is retrieved within said post independently of said shroud, suspending the latter from the top of said post on the outside thereof at the point at which said cable is secured to said shroud and drawing said rings into close juxtaposition providing a plurality of folds in said shroud between adjacent guiding connections.

4. Combination as claimed in claim 1, including a reinforcing web fixed to said shroud extending along the longitudinal center line thereof, to which said bumper engaging means, said cable and said guiding connections are secured, a tethering strap extending from said web at the end thereof remote from said bumper engaging means at the point of securement to the web of the guiding connection closest to said post, said tethering strap being secured to said post at an intermediate point in the length thereof, and straps secured to said post above and below said tethering strap for holding the shroud, when furled, against said post.

References Cited in the file of this patent

UNITED STATES PATENTS

| Number | Name | Date |
|---|---|---|
| 1,228,081 | Walker | May 29, 1917 |
| 1,286,895 | Arrell | Dec. 10, 1918 |
| 1,918,423 | Persinger | July 18, 1933 |
| 2,097,923 | Hutchinson | Nov. 2, 1937 |